United States Patent
Virnich et al.

(10) Patent No.: US 8,994,385 B2
(45) Date of Patent: Mar. 31, 2015

(54) PLURAL-FREQUENCY CAPACITIVE OCCUPANCY SENSING SYSTEM

(75) Inventors: Michael Virnich, Korlingen (DE); David Hoyer, Ayl (DE); Martin Thinnes, Trierweiler (DE); Michael Puetz, Trier (DE); Thomas Meyers, Bitburg (DE)

(73) Assignee: IEE International Electronics & Engineering S.A., Luxembourg (LU)

( * ) Notice: Subject to any disclaimer, the term of this patent is extended or adjusted under 35 U.S.C. 154(b) by 214 days.

(21) Appl. No.: 13/554,242

(22) Filed: Jul. 20, 2012

(65) Prior Publication Data

US 2013/0021045 A1 Jan. 24, 2013

(30) Foreign Application Priority Data

Jul. 20, 2011 (LU) .......................................... 91843

(51) Int. Cl.
| | |
|---|---|
| *G01R 27/26* | (2006.01) |
| *G01R 19/00* | (2006.01) |
| *B60N 2/00* | (2006.01) |
| *B60N 2/56* | (2006.01) |
| *B60R 21/015* | (2006.01) |

(52) U.S. Cl.
CPC .............. *B60N 2/002* (2013.01); *B60N 2/5685* (2013.01); *B60R 21/01532* (2013.01)
USPC .............................. 324/686; 324/658; 702/64

(58) Field of Classification Search
CPC . B60N 2/5685; B60N 2/002; B60R 21/01532
USPC .......................... 324/658–690; 702/64, 47, 52
See application file for complete search history.

(56) References Cited

U.S. PATENT DOCUMENTS

| | | | | |
|---|---|---|---|---|
| 6,161,070 A | * | 12/2000 | Jinno et al. ...................... | 701/45 |
| 6,392,542 B1 | | 5/2002 | Stanley | |

(Continued)

FOREIGN PATENT DOCUMENTS

| | | | |
|---|---|---|---|
| WO | 9217344 A1 | 10/1992 | |
| WO | 9513204 A1 | 5/1995 | |

OTHER PUBLICATIONS

J.R. Smith, "Electric Field Sensing for Graphical Interfaces", IEEE Computer Graphics and Applications; published in Computer Graphics I/O Devices, Issue May/Jun. 1998, pp. 54-60.

*Primary Examiner* — Melissa Koval
*Assistant Examiner* — Farhana Hoque
(74) *Attorney, Agent, or Firm* — Cantor Colburn LLP

(57) ABSTRACT

A plural-frequency capacitive occupancy sensing system comprises an antenna electrode and a detection circuit, which is configured to drive the antenna electrode at least with a first and a second signal at a first and a second frequency, respectively, so as to obtain at least a first and a second measurement value indicative of at least one of conductance, susceptance, resistance, reactance and capacitance between the antenna electrode and a reference node, at the first frequency and the second frequency, respectively. The detection circuit compares the capacitance between the antenna electrode and the reference node with a threshold capacitance, the threshold capacitance being derived from a difference between the first and second measurement values and/or the capacitance between the antenna electrode and the reference node being corrected based upon the difference between the measurement values. The detection circuit outputs an occupancy state signal depending on the comparison.

18 Claims, 4 Drawing Sheets

(56) References Cited

U.S. PATENT DOCUMENTS

| | | | |
|---|---|---|---|
| 6,703,845 B2 * | 3/2004 | Stanley et al. | 324/663 |
| 7,521,940 B2 | 4/2009 | Koch et al. | |
| 2007/0182553 A1 * | 8/2007 | Kamizono et al. | 340/561 |
| 2007/0194900 A1 * | 8/2007 | Hawkins et al. | 340/457.1 |
| 2008/0186034 A1 * | 8/2008 | Scheckenbach et al. | 324/679 |
| 2009/0295199 A1 | 12/2009 | Kincaid et al. | |

* cited by examiner

PLURAL-FREQUENCY CAPACITIVE OCCUPANCY SENSING SYSTEM

TECHNICAL FIELD

The present invention generally relates to a capacitive occupant detection system, e.g. for detecting the absence or presence of an occupant seated on a vehicle seat. A preferred embodiment of the invention relates to a combined seat heating and capacitively occupancy sensing device.

BACKGROUND OF THE INVENTION

A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, which an oscillating electric signal is applied to and which thereupon emits an electric field into a region of space proximate to the antenna electrode, while the sensor is operating. The sensor comprises at least one sensing electrode at which the influence of an object or living being on the electric field is detected. In some (so-called "loading mode") capacitive occupancy sensors, the one or more antenna electrodes serve at the same time as sensing electrodes. In this case, the measurement circuit determines the current flowing into the one or more antenna electrodes in response to an oscillating voltage being applied to them. The relationship of voltage to current yields the complex impedance or admittance of the one or more antenna electrodes. In an alternative type of capacitive sensors ("coupling mode" capacitive sensors), the transmitting antenna electrode(s) and the sensing electrode(s) are separate from one another. In this case, the measurement circuit determines the current or voltage that is induced in the sensing electrode when the transmitting antenna electrode is operating.

The different capacitive sensing mechanisms are explained in the technical paper entitled "Electric Field Sensing for Graphical Interfaces" by J. R. Smith, published in Computer Graphics I/O Devices, Issue May/June 1998, pp 54-60. The paper describes the concept of electric field sensing as used for making non-contact three-dimensional position measurements, and more particularly for sensing the position of a human hand for purposes of providing three-dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as the above-mentioned "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The idea of using the heating element of a seat heater as an antenna electrode of a capacitive occupancy sensing system has been known for a long time. WO 92/17344 A1 discloses a an electrically heated vehicle seat with a conductor, which can be heated by the passage of electrical current, located in the seating surface, wherein the conductor also forms one electrode of a two-electrode seat occupancy sensor.

WO 95/13204 discloses a similar system, in which the oscillation frequency of an oscillator connected to the heating element is measured to derive the occupancy state of the vehicle seat.

U.S. Pat. No. 7,521,940 relates to a combined seat heater and capacitive sensor capable of operating, at a given time, either in heating mode or in occupant-sensing mode. The device includes a sensor/heat pad for transmitting a sensing signal, a first diode coupled to a first node of the sensor/heat pad, a second diode coupled to a second node of the sensor/heat pad, a first transistor coupled to the first diode and a second transistor coupled to the second diode. During sensing mode, the first and second transistors are opened and the nodes between the first transistor and the first diode, as well as between the second transistor and the second diode are reverse-biased to isolate the sensor/heat pad from the power supply of the heating circuit.

US 2009/0295199 discloses a combined seat heater and capacitive sensor, wherein each of the two terminals of the heating element is connected to the heating power supply via two transistors in series. The device may not operate in sensing mode and in heating mode at a time. When the device is in sensing mode, the nodes between each pair of transistors are actively kept at the same potential as the heating element by means of respective voltage followers in order to neutralize any open-switch impedance of the transistors.

The very same idea has already been disclosed in U.S. Pat. No. 6,703,845. As an alternative to transistors, that document discloses inductors to achieve a high impedance at the frequency of the oscillating signal between the heating element and the power source of the heating circuit. As in the previously discussed document, a voltage follower maintains the intermediate nodes substantially at the same potential as the heating element in order to effectively isolate, at the frequency of the oscillating signal, the power supply of the heating circuit from the heating element.

A disadvantage of the system disclosed in U.S. Pat. No. 6,703,845 is that the inductors used as AC-decoupling elements have to support the full heating current (up to 10 A DC and more) and present high AC impedance to the capacitive measurement circuit and the seat heater at the same time. High inductance and high operating DC current implies that the inductor have to be wound on large cores, which are expensive. Depending on the application chosen from U.S. Pat. No. 6,703,845, either two or four of these inductors have to be used.

TECHNICAL PROBLEM

It is an object of the present invention to provide a capacitive occupancy sensing system with an improved robustness against changes in environmental conditions, such as, for instance, temperature, humidity or moisture. This object is achieved by a capacitive occupancy sensing system as claimed in claim 1.

GENERAL DESCRIPTION OF THE INVENTION

The inventors have found that the discrimination between a car seat occupancy condition that has to be detected as "occupied" (seat occupied by $5^{th}$ percentile female or a heavier person) and a car seat occupancy condition that has to be detected as "not occupied" (seat empty or carrying a child restraint system) can be made more reliable by using a threshold capacitance that depends on the difference determined in conductance, susceptance, resistance, reactance and/or capacitance between to frequencies of the measurement signal. Instead of using a variable threshold, it is also possible to apply a correction to the measured capacitance that is compared with the capacitance threshold.

A capacitive occupancy sensing system according to the invention thus comprises an antenna electrode and a detection circuit (e.g. an application-specific integrated circuit, a field-programmable gate array, a microcontroller, or the like). The detection circuit is configured to drive the antenna electrode at least with a first and a second signal at a first and a second, different, frequency, respectively, so as to obtain at least a first and a second measurement value indicative of
 a) conductance,
 b) susceptance,
 c) resistance,
 d) reactance and/or
 e) capacitance
between the antenna electrode and a reference node, at the first frequency and the second frequency, respectively. In order to determine the occupancy state, the detection circuit is further configured to compare a capacitance between the antenna electrode and the reference node with a threshold capacitance. As a first option, the threshold may be stored in the detection circuit as a function of the difference between the first and second measurement values. In this case, the detection circuit derives the threshold capacitance from the difference and then compares it with the capacitance between the antenna electrode and the reference node. A second option is to configure the detection circuit to use a fixed threshold and to correct the capacitance between the antenna electrode and the reference node based upon the difference between the first and second measurement values. It would also be possible to use a combination of these options. The detection circuit is further configured to output an occupancy state signal depending on the outcome of the comparison.

The first frequency is preferably comprised in the range from 10 kHz to 200 kHz and the second frequency is preferably comprised in the range from 200 kHz to 1 MHz.

The reference node may be a grounded node (connected e.g. to system ground).

Preferably, the capacitance compared with the threshold capacitance is the capacitance between the antenna electrode and the reference node at the first frequency or the second frequency.

According to a preferred embodiment of the invention, the dependency of the threshold capacitance on the difference between the measurement values is stored in the detection circuit as one or more lookup tables, and the detection circuit is configured to derive the threshold capacitance based upon these one or more lookup tables.

Alternatively or additionally, the detection circuit is configured to calculate the capacitance to be compared with the threshold capacitance using the measured capacitance and a correction term or factor, the correction term or factor being derived from the difference between the first and second measurement values. The detection circuit may use one or more lookup tables to derive the correction term or factor.

According to a preferred embodiment of the invention, the antenna electrode comprises (includes as a part or consists of) a heating element, e.g. a heating wire, a heating cable, a film-based heating element, a fibre-based heating element, etc. The heating element may be that of a seat heater. Preferably, the capacitive occupancy sensing system comprises a common mode choke, with which the heating element is DC-couplable to a heating circuit (source of the heating current, thermostat, etc.). As will be appreciated, the common mode choke essentially prevents the first and second signal from passing to the reference node via the heating circuit.

A preferred aspect of the invention concerns an occupiable item comprising a capacitive occupancy sensing system as described herein. The occupiable item could be a hospital bed. Preferably, however, the occupiable item comprises a car seat.

BRIEF DESCRIPTION OF THE DRAWINGS

Preferred embodiments of the invention will now be described, by way of example, with reference to the accompanying drawings in which.

DESCRIPTION OF PREFERRED EMBODIMENTS

Capacitive occupant detection systems in the automotive industry, which are used to detect the presence of an occupant in order to activate the airbag in case of a crash, typically determine the occupancy state by measuring the complex impedance/admittance seen by the sensing element (the antenna electrode) arranged in the seat. This sensing element can be one or more electrodes, dedicated exclusively to occupancy detection, or the seat heating element. The determination of the complex impedance/admittance can be achieved by either measuring its real and imaginary parts or by measuring the absolute value and the phase angle of the complex impedance/admittance. This can be done at one or several measurement frequencies to gain more information about the occupancy situation.

Figure 1:
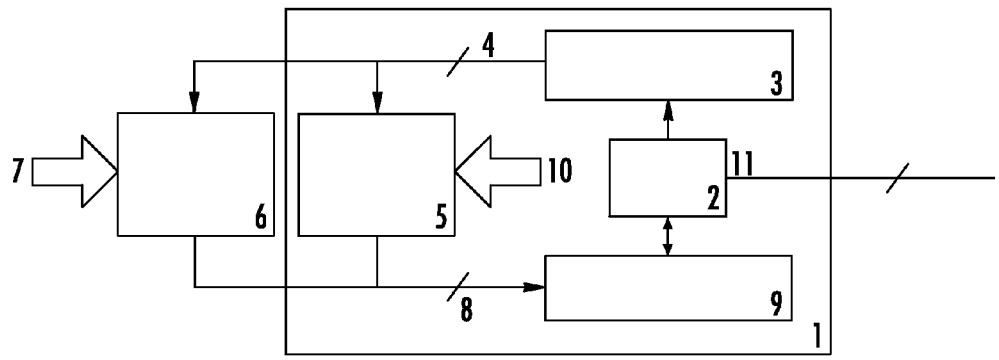
FIG. 1 is a schematic view of the basic structure of a capacitive occupancy sensing system.

Referring to FIG. 1, which shows the basic structure of a capacitive occupancy sensing system:
1 is the capacitive occupancy sensing system;
2 is a control unit, e.g. a microcontroller;
3 is a signal generator (e.g. an oscillator) for driving one or more AC signals into the antenna electrode (not shown);
4 is the AC signal (e.g. voltage at one or more frequencies);
5 is the system-inherent complex impedance/admittance seen by signal generator 3, e.g. a complex measurement offset;
6 is the complex impedance/admittance seen by signal generator 3, representing the occupancy situation on the seat;
7 are external influencing factors having an impact on the complex impedance/admittance 6, e.g. humidity, temperature etc.
8 is the complex useful signal (e.g. current amplitude and phase angle or real and imaginary parts of the current);
9 is the useful signal evaluation unit
10 are internal influencing factors having an impact on the system-inherent complex impedance/admittance 5, e.g. temperature, aging etc.;
11 is a communication line.

The control unit 2 triggers the generation of an AC signal 4, generated by the signal generator 3. This AC signal is applied to the complex impedances/admittances 5 and 6. Complex impedance/admittance 6, which is basically the complex impedance/admittance seen by the antenna electrode in the seat, represents the occupancy state of the seat. This complex impedance/admittance can vary due to the influencing factors 7. It is required that these influencing factors shall not degrade the system's ability to detect the correct occupancy situation as long as the environmental influence is part of the application profile of the system, e.g. the sensing system shall be able to detect the correct occupancy state even in wet seat condition. Influencing factors 10, like e.g. temperature, cause a variation of the system-inherent complex impedance/admittance 5, leading to measurement errors which can degrade the systems performance.

Both complex impedances/admittances 5 and 6 transfer the AC signal 4 into the complex useful signal 8, which carries the information about the occupancy situation on the passenger seat. This information can be extracted by the control unit 2 using the useful signal evaluation unit 9 by either evaluating the amplitude and/or phase angle of the complex useful signal or by determining the real part and imaginary part of the measurement signal and by any other technique to characterize a complex signal. After the occupancy state has been determined, an output signal indicating the occupancy state is transferred to the vehicle using the communication line 11.

Techniques to cope with the influences 6, means to compensate for external environmental influences like humidity in the seat, are known and described e.g. in some of the documents indicated in the Background section hereinabove.

Nonetheless, the internal influences 10 on the system-inherent complex load 5 can cause that the measurements, which are necessary to determine the environmental condition in the seat, cannot be done be performed with sufficient accuracy, leading to a degrading of the detection performance of the system 1.

Figure 2:
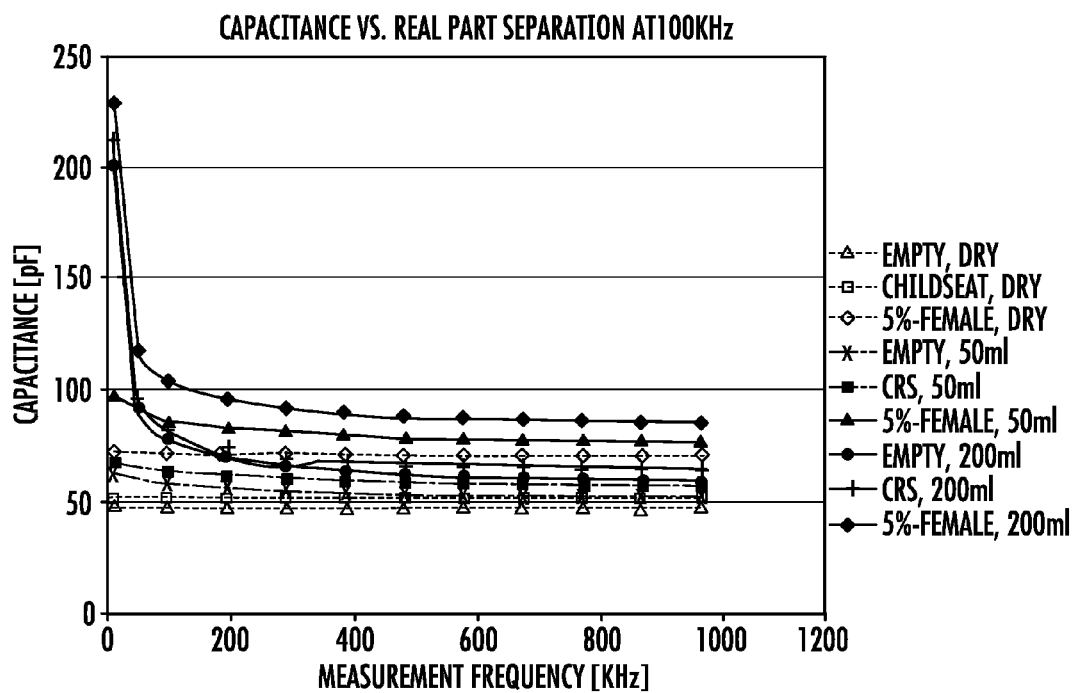
FIG. 2 is a diagram illustrating the change in capacitance over frequency in different seat occupancy situations.

FIG. 2 shows the capacitance seen by the sensing element in vehicle seat exemplified for different occupancy situations, humidity levels and measurement frequencies. The shown capacitance values have been determined by measuring the imaginary part of the complex admittance followed by the mathematical calculation of the capacitive value. For this calculation it has been assumed that the sensing element couples to ground via a purely resistive path and a purely capacitive path, both paths being in parallel to one another.

Whereas there is almost no variation in the capacitance value over frequency in dry conditions, the capacitance values measured in wet conditions (shown for 50 ml and for 200 ml of water poured on the seat) decrease with increasing frequency. Due to the fact that the capacitance values measured with an empty seat (curves labelled "Empty") and a seat occupied by a child restraint system (curves labelled "CRS") increase with rising water quantity, differentiation between 'Empty'/'CRS' (which should lead to the seat being detected as "not occupied") and '5%-Female' (which should lead to the seat being detected as "occupied") is difficult if only the capacitance values at low frequencies are taken into account.

Figure 3:
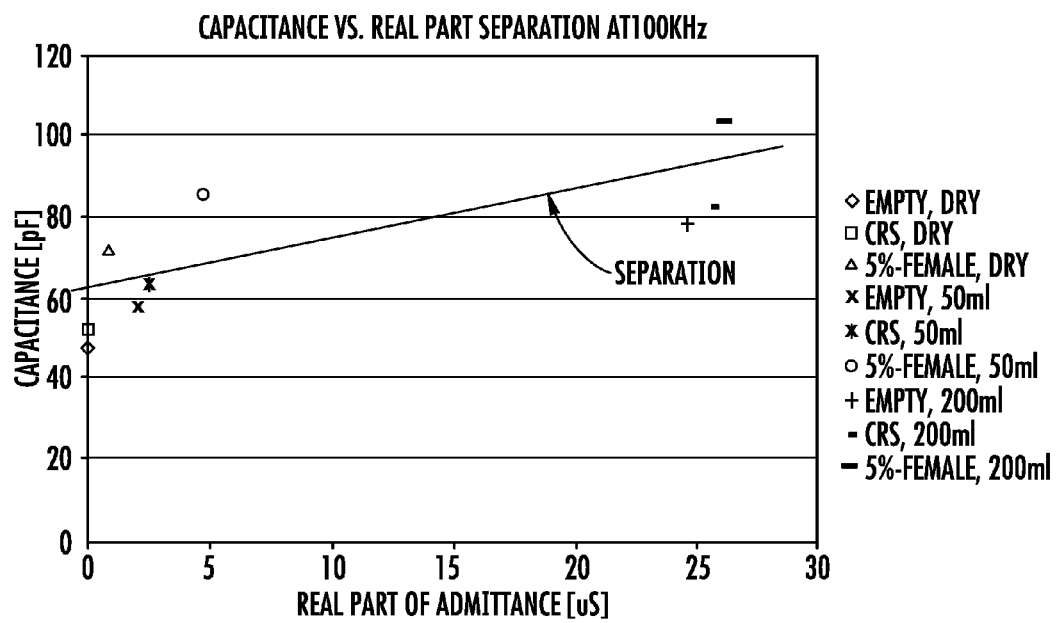
FIG. 3 is a diagram illustrating the discrimination between an occupied seat and a not occupied seat based upon the capacitance and the real part of the admittance at a single frequency.

To get rid of this problem, in today's single-frequency capacitive systems, not only the capacitance but also the real part of the complex impedance/admittance is measured at the same frequency. By means of this approach, differentiation between 'Empty'/'CRS' and '5%-Female' is again possible, since the real part of e.g. the complex admittance increases with rising water quantities in the seat. FIG. 3 shows the resulting separation between 'Empty'/'CRS' and '5%-Female', based on the results of the real and imaginary part measurement at one frequency. The separation line represents the threshold capacitance, varying with the real part of the admittance, above which a measured capacitance value indicates that the seat is occupied and below which it indicates that the seat is not occupied.

Figure 4:
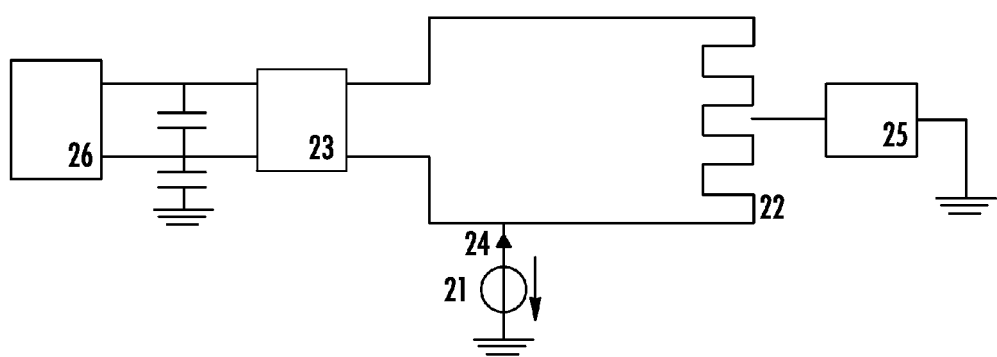
FIG. 4 is a block schematic diagram of a capacitive occupancy sensing system using the heating element of a seat heater as the antenna electrode.

Referring to FIG. 4, which shows the basic structure of a capacitive measurement system using the heating element of a seat heater as the sensing element (the antenna electrode):
21 is the AC voltage source of the capacitive sensing system;
22 is a seat heating element (e.g. a resistive wire, fibre or cable, or a film-based electrode comprising a carrier film and a resistive material printed thereon);
23 is an AC decoupling element;
24 is the measurement current;
25 is the complex impedance/admittance representing the occupancy situation
26 the heating circuit (seat heater control circuit including the source/drain of the heating current).

The AC voltage 21 is applied to the seat heating element 22, which is decoupled from the vehicle's ground (GND), respectively from the seat heater control unit by the AC decoupling element 23. The measurement current 24 flows through the complex impedance/admittance 25. As indicated hereinabove, the amplitude and phase angle of the measurement current depends on the frequency. This may be used to determine the occupancy situation and environmental condition in the seat by performing a comparison between the measured signal and predetermined relation between measurement signals and different occupancy situations under different environmental conditions.

The drawback of this approach is that the measurement system's performance depends on the tolerances of its components and their susceptibility against influences like temperature, aging etc. Especially, parasitic parameters, which are hard to control, and their variation can cause a degrading of performance.

Figure 5:
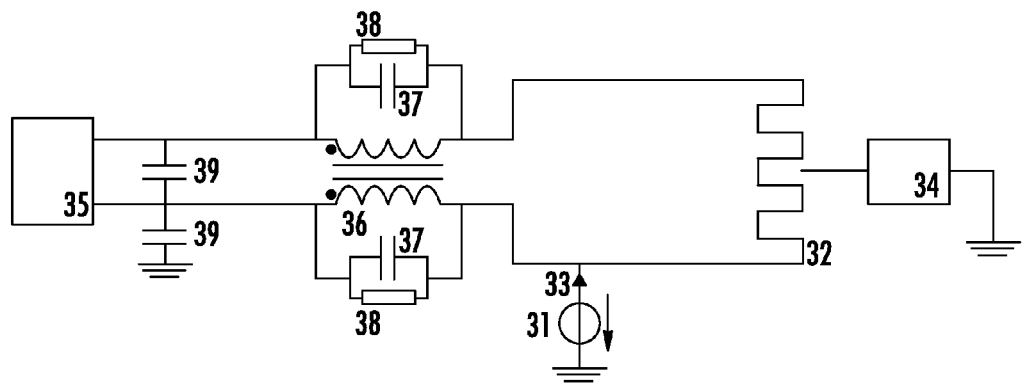
FIG. 5 is a block schematic diagram of a variant of the capacitive occupancy sensing system of FIG. 4, wherein a common mode choke is used for AC decoupling the heating element from the heating circuit.

For example, the AC decoupling element 23 shown in FIG. 4 is advantageously implemented as a common mode choke as shown in FIG. 5. Referring to FIG. 5,

31 is the AC voltage source of the capacitive sensing system;
32 is the seat heating element;
33 is the measurement current;
34 is the complex impedance/admittance representing the occupancy situation;
35 is the heating circuit;
36 is a common mode choke;
37 are parasitic capacitances;
38 are parasitic parallel resistances;
39 are GND coupling capacitors.

The common mode choke 36 together with its parasitic capacitances 37 and parallel resistances 38 generates a parallel complex load to the complex impedance/admittance 34 that represents the occupancy situation and the environmental condition in the seat. As this complex parallel load is subject to environmental influences (temperature, aging, . . . ), the ability of the system to determine the correct occupancy state is degraded in the presence of such components, if no countermeasures are taken. The main reason for this is that the magnetic core properties of the common mode choke 36 vary over production, temperature and other influences. Whereas the parasitic capacitances 37 remain virtually constant over temperature as they depend only on temperature invariant parameters like the number of windings, winding technique used, wire diameter etc, the parallel resistances 38 vary over temperature. Since they can reach very low values, they may dominate the real part of the impedance/admittance seen by the sensing electrode (i.e. seat heating element 32). This would cause all known methods to fail in detecting the correct occupancy situation, especially under variable environmental influences (humidity in the seat and varying magnetic core temperature).

As an exemplified countermeasure, an expensive calibration of the system over temperature might become necessary, together with the use of one or more temperature probes for monitoring the choke's core temperature in order to compensate for the temperature influence.

According to the present invention, a different approach is taken.

The complex impedance/admittance 34 is usually formed by an RC network that has a frequency dependency in its imaginary and also in its real part. This frequency dependence itself depends on the environmental condition (humidity in the seat etc).

Figure 6:
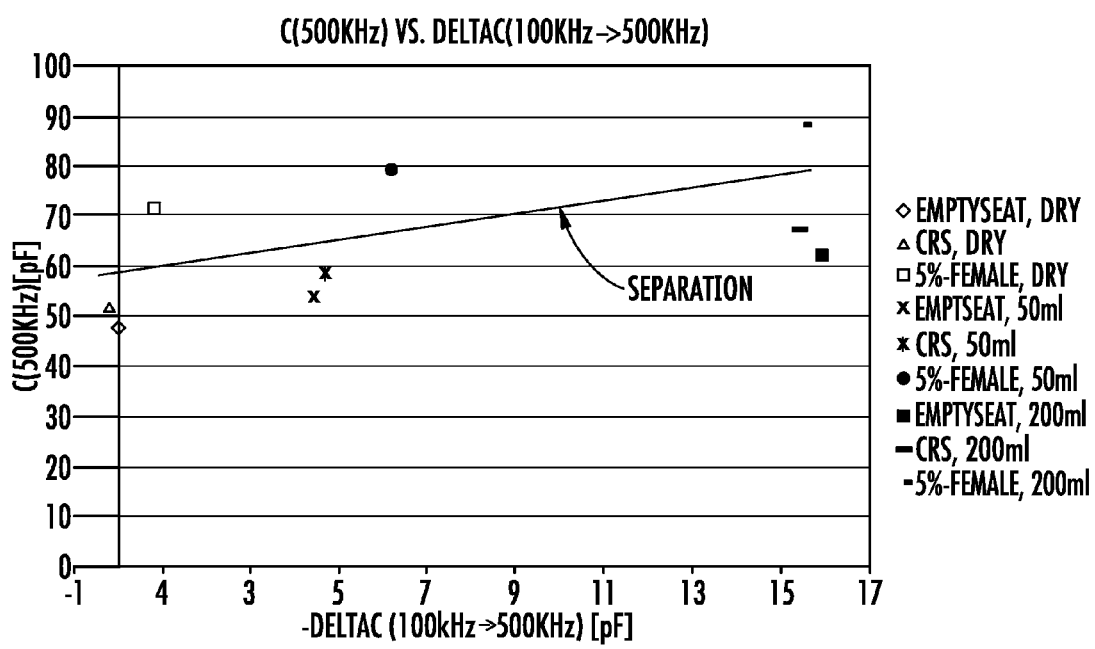
FIG. 6 is a diagram illustrating the discrimination between an occupied seat and a not occupied seat based upon the capacitance at 500 kHz and the difference in capacitance between 100 kHz and 500 kHz.

The environmental condition is determined by evaluating the change of either the real or imaginary part of the impedance/admittance over frequency. The parasitic capacitances 37 cannot be neglected, but they do virtually not vary under changes of the external influences. FIG. 6 shows a clear separation between the situations 'Empty'/'CRS' and 5%-Female. The x-axis indicates the difference between the capacitance value at a first frequency (here: 100 kHz) and the capacitance value at a second frequency (here: 500 kHz). The y-axis indicates the capacitive value of the complex admittance 34 at 500 kHz. The separation line indicates that the occupied states can be clearly distinguished from the not occupied states.

In a practical implementation of the capacitive occupancy sensing system, the separation line, which corresponds to a capacitance threshold that depends on the difference between the capacitance value at 100 kHz and the capacitance value at 500 kHz, is stored in the detection circuit (comprised e.g. of control unit 2, signal generator 3 and useful signal evaluation unit 9, and implemented as an ASIC, an FPGA or a microcontroller) as one or more lookup tables.

To determine the occupancy state of the seat, the detection circuit proceeds as follows: it measures (at least) the imaginary part of the complex admittance at 100 kHz and at 500 kHz (or another suitable frequency pair). It then calculates the corresponding capacitance values. The detection circuit looks up the difference of the capacitance values in the lookup table and retrieves the capacitance threshold. It compares the capacitance value at 500 kHz with the capacitance threshold:

if the capacitance value at 500 kHz is greater than the capacitance threshold, the detection circuit outputs a signal indicating that the seat is occupied, and if the capacitance value at 500 kHz is less than the capacitance threshold, the detection circuit outputs a signal indicating that the seat is not occupied.

Figure 7:
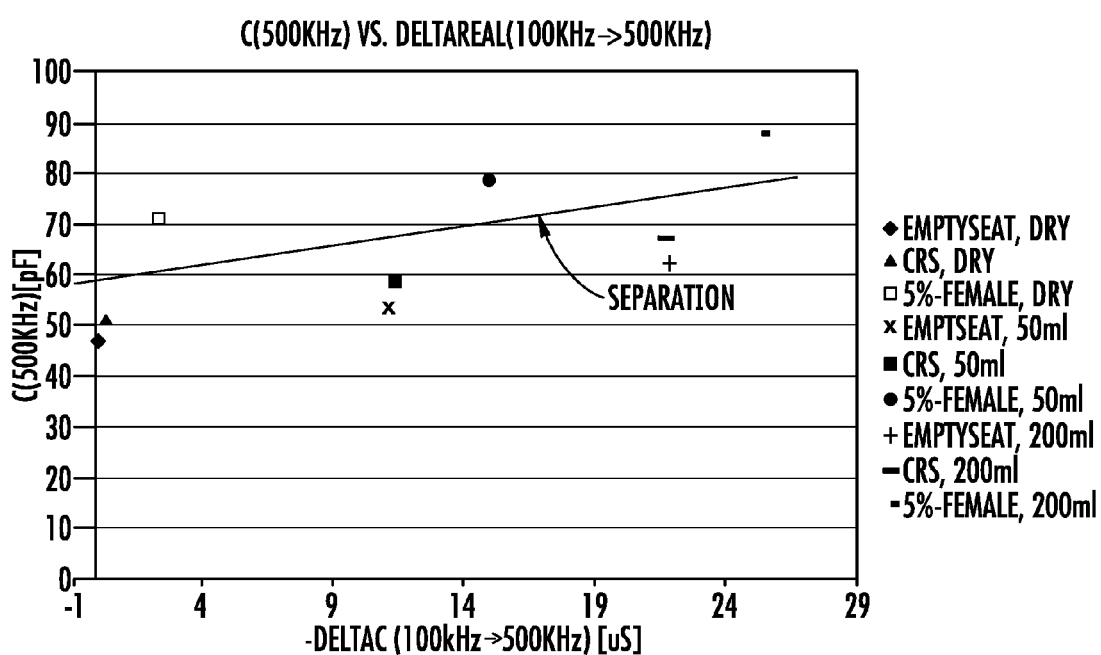
FIG. 7 is a diagram illustrating the discrimination between an occupied seat and a not occupied seat based upon the capacitance at 500 kHz and the difference in the real parts of the admittance between 100 kHz and 500 kHz.

FIG. 7 shows another possibility. Here, the capacitance value at 500 kHz is plotted against the difference between the real part of the complex admittance at 100 kHz and the real part of the complex admittance at 500 kHz. FIG. 7 also shows a clear separation between the situations 'Empty'/'CRS' and 5%-Female.

The separation line corresponds to the capacitance threshold that depends on the difference between the real part of the complex admittance at 100 kHz and the real part of the complex admittance at 500 kHz, is again preferably stored in the detection circuit as one or more lookup tables.

In this case, the detection circuit proceeds as follows: it measures the real and imaginary parts of the complex admittance at 100 kHz and at 500 kHz (or another suitable frequency pair). It then looks up the difference between the real parts in the lookup table and retrieves the capacitance threshold. It calculates the capacitance value at 500 kHz based upon the imaginary part of the admittance and then compares the so-obtained capacitance value with the capacitance threshold:

if the capacitance value at 500 kHz is greater than the capacitance threshold, the detection circuit outputs a signal indicating that the seat is occupied, and if the capacitance value at 500 kHz is less than the capacitance threshold, the detection circuit outputs a signal indicating that the seat is not occupied.

As a complex admittance can be mathematically transferred into a complex impedance and vice versa (i.e. the electrical load 34 representing the occupancy state on and the environmental condition in the seat may be described as a complex impedance instead of a complex admittance), the detection circuit may be configured to work with the complex impedance instead of complex admittance.

As those skilled in the art will appreciate, the capacitance can be calculated from the imaginary part of the admittance if the inductance of the common mode choke is known (using the formula: $\mathrm{Im}(Y) = \omega C_x - 1/(\omega L)$, where Y is the complex admittance, $C_x$ is the capacitance to be measured, L is the inductance of the common mode choke and $\omega$ is the radian frequency ($\omega = 2\pi f$) of the measurement signal). It may happen that the inductance of the common mode choke changes with temperature and ageing. In this case, one may use the following formula in order to obtain $C_x$ at a given frequency $\omega$ (e.g. $2\pi*100$ kHz or $2\pi*500$ kHz in the above examples):

$$C_x(\omega) = \frac{\omega_1 \cdot I_{i1} - \omega_2 \cdot I_{i2}}{U \cdot (\omega_1^2 - \omega_2^2)},$$

where $\omega_1$ and $\omega_2$ are two frequencies slightly offset from the frequency $\omega$ ($\omega_1=\omega-\Delta\omega$, $\omega_2=\omega+\Delta\omega$, where $\Delta\omega$ is a small frequency offset, e.g. 5 kHz), $I_{i1}$ and $I_{i2}$ are the imaginary parts of the complex currents flowing into the heating element, measured at $\omega_1$ and $\omega_2$, respectively, and U is the amplitude of the AC voltage applied by the signal generator at both frequencies $\omega_1$ and $\omega_2$.

It is worthwhile noting that the complexity of the sensing system can be reduced if only the imaginary part of the complex impedance/admittance 34 is measured, as in the example described with reference to FIG. 6. This may lead to cost savings.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. Plural-frequency capacitive occupancy sensing system, comprising an antenna electrode and a detection circuit, said detection circuit being configured
   to drive said antenna electrode at least with a first and a second signal at a first and a second frequency, respectively;
   to obtain at least a first and a second measurement value indicative of at least one of conductance, susceptance, resistance, reactance and capacitance between said antenna electrode and a reference node, at said first frequency and said second frequency, respectively, the first frequency selected from a first frequency range and the second frequency selected from a second frequency range, said second frequency range being different from and non-overlapping with the first frequency range;
   to compare a measured value between said antenna electrode and said reference node with a threshold value, said threshold value being derived from a difference between said first and second measurement values; and
   to output an occupancy state signal depending on an outcome of said comparison.

2. The capacitive occupancy sensing system as claimed in claim 1, wherein said first frequency is comprised in the range from 10 kHz to 200 kHz, and wherein said second frequency is comprised in the range from 200 kHz to 1 MHz.

3. The capacitive occupancy sensing system as claimed in claim 1, wherein said reference node is a grounded node.

4. The capacitive occupancy sensing system as claimed in claim 1, wherein said first and second measurement values are indicative of conductance between said antenna electrode and said reference node, at said first frequency and said second frequency, respectively.

5. The capacitive occupancy sensing system as claimed in claim 1, wherein said first and second measurement values are indicative of susceptance between said antenna electrode and said reference node, at said first frequency and said second frequency, respectively.

6. The capacitive occupancy sensing system as claimed in claim 1, wherein said first and second measurement values are indicative of resistance between said antenna electrode and said reference node, at said first frequency and said second frequency, respectively.

7. The capacitive occupancy sensing system as claimed in claim 1, wherein said first and second measurement values are indicative of reactance between said antenna electrode and said reference node, at said first frequency and said second frequency, respectively.

8. The capacitive occupancy sensing system as claimed in claim 1, wherein said first and second measurement values are indicative of capacitance between said antenna electrode and said reference node, at said first frequency and said second frequency, respectively.

9. The capacitive occupancy sensing system as claimed in claim 1, wherein said capacitance compared is the capacitance between said antenna electrode and said reference node, at said first frequency or said second frequency.

10. The capacitive occupancy sensing system as claimed in claim 1, wherein said detection circuit is configured to derive said threshold capacitance based upon one or more lookup tables.

11. The capacitive occupancy sensing system as claimed in claim 1, wherein said detection circuit is configured to calculate said capacitance compared with said threshold capacitance using a measured capacitance and a correction term or factor, said correction term or factor being derived from said difference between said first and second measurement values.

12. The capacitive occupancy sensing system as claimed in claim 11, wherein said detection circuit is configured to derive said correction term or factor based upon one or more lookup tables.

13. The capacitive occupancy sensing system as claimed in claim 1, wherein said antenna electrode comprises a heating element.

14. The capacitive occupancy sensing system as claimed in claim 13, wherein said capacitive occupancy sensing system comprises a common mode choke, with which said heating element is DC-couplable to a heating circuit, said common mode choke for essentially preventing said first and second signal from passing to said reference node via said heating circuit.

15. The capacitive occupancy sensing system as claimed in claim 13, wherein said heating element comprises at least one of a heating wire, a heating cable, a film-based heating element and a fibre-based heating element.

16. Occupiable item comprising a capacitive occupancy sensing system as claimed in claim 1.

17. Occupiable item as claimed in claim 16, wherein said occupiable item comprises a car seat.

18. The capacitive occupancy sensing system of claim 1, wherein the threshold value is derived from the difference between said first and second measurement values and/or an antenna capacitance between said antenna electrode and said reference node being corrected based upon said difference between said first and second measurement values.

* * * * *